(12) United States Patent
Huang et al.

(10) Patent No.: US 12,316,145 B1
(45) Date of Patent: May 27, 2025

(54) POWER BATTERY MANAGMENT SYSTEM BASED ON PERSONALIZED CONFIGURATION

(71) Applicant: Sichuan Camy New Energy Co, Ltd., Chengdu (CN)

(72) Inventors: Yiping Huang, Chengdu (CN); Dingpeng Zhan, Chengdu (CN); Yanchun Niu, Chengdu (CN); Chao He, Chengdu (CN); Lu Zhang, Chengdu (CN)

(73) Assignee: Sichuan Camy New Energy Co, Ltd., Chengdu (CN)

( * ) Notice: Subject to any disclaimer, the term of this patent is extended or adjusted under 35 U.S.C. 154(b) by 0 days.

(21) Appl. No.: 19/015,829

(22) Filed: Jan. 10, 2025

Related U.S. Application Data

(63) Continuation of application No. PCT/CN2024/097339, filed on Jun. 4, 2024.

(30) Foreign Application Priority Data

Mar. 19, 2024 (CN) .......................... 202410312789.8

(51) Int. Cl.
*H02J 7/00* (2006.01)

(52) U.S. Cl.
CPC ........ *H02J 7/00045* (2020.01); *H02J 7/0013* (2013.01); *H02J 7/0063* (2013.01); *H02J 7/00712* (2020.01)

(58) Field of Classification Search
CPC .................................. H02J 7/00045
USPC ......................................................... 320/128
See application file for complete search history.

(56) References Cited

U.S. PATENT DOCUMENTS

| | | | |
|---|---|---|---|
| 2018/0188332 A1* | 7/2018 | Newman | B60K 35/10 |
| 2019/0173295 A1* | 6/2019 | Morin | H02J 7/00038 |
| 2021/0194069 A1* | 6/2021 | Hamblin | H01M 4/382 |
| 2021/0305828 A1* | 9/2021 | Shih | H02J 7/00712 |

FOREIGN PATENT DOCUMENTS

| | | |
|---|---|---|
| CN | 102263303 A | 11/2011 |
| CN | 203179566 U | 9/2013 |
| CN | 212046993 U | 12/2020 |
| CN | 112673519 A | 4/2021 |

(Continued)

*Primary Examiner* — Yalkew Fantu
(74) *Attorney, Agent, or Firm* — Bayramoglu Law Offices LLC

(57) ABSTRACT

A power battery management system based on personalized configuration includes: a power battery configuration terminal, including multiple groups of power battery connection interfaces connected to a power battery unit; a power bus, connected to the power battery unit through the power battery connection interface; a charging configuration terminal, including a charging connection interface, where a charging device is connected to the power bus through the charging connection interface; a power supply configuration terminal, including a power supply connection interface, where engineering equipment is connected to the power bus through the power supply connection interface; and a main control unit, used to control the power charging and discharging operation of the power battery unit, the charging operation of the charging device, and the power supply operation of the engineering equipment.

9 Claims, 6 Drawing Sheets

(56) References Cited

FOREIGN PATENT DOCUMENTS

| | | | |
|---|---|---|---|
| CN | 112713319 | A | 4/2021 |
| CN | 215119008 | U | 12/2021 |
| CN | 114228562 | A | 3/2022 |
| CN | 216288702 | U | 4/2022 |
| CN | 114629248 | A | 6/2022 |
| CN | 217036766 | U | 7/2022 |
| CN | 117081191 | A | 11/2023 |
| CN | 117465286 | A | 1/2024 |
| CN | 117901664 | A | 4/2024 |
| EP | 4318867 | A2 | 2/2024 |

* cited by examiner

POWER BATTERY MANAGMENT SYSTEM BASED ON PERSONALIZED CONFIGURATION

CROSS-REFERENCE TO THE RELATED APPLICATIONS

This application is a continuation application of International Application No. PCT/CN2024/097339, filed on Jun. 4, 2024, which is based upon and claims priority to Chinese Patent Application No. 202410312789.8, filed on Mar. 19, 2024, the entire contents of which are incorporated herein by reference.

TECHNICAL FIELD

The present invention relates to the field of battery management technology, and specifically to a power battery management system based on personalized configuration.

BACKGROUND

With the continuous development of new energy technology and the continuous improvement of related industries in recent years, battery technology has been continuously applied to more fields, and power batteries have been increasingly applied to the field of engineering equipment. As a result, people's requirements for power battery-related user experience are also constantly improving.

In the field of non-engineering equipment, power batteries are widely used in automobiles and other fields. Due to their great reproducibility, the standardization of power batteries in the above fields has become more and more mature. Specifically, for the same vehicle model or the vehicle models with the same configuration, a large number of needs can be met by designing a set of power battery configuration and control solutions. However, in the process of applying the above solution to the field of engineering equipment, technicians have found at least the following technical problems:

On one hand, the demand for the field of engineering equipment is often not large, and a company may only need a few engineering equipment to meet its general usage needs; on the other hand, different companies have different power demand parameters for engineering equipment, and there may even be huge differences. Therefore, in the prior arts, each company is often provided with a customized power battery management system to meet its personalized needs. This leads to high costs for battery management system suppliers and the inability to output corresponding products on a large scale and in a systematic manner, which restricts the development of the company.

SUMMARY

In order to overcome the above technical problems existing in the prior art, the embodiment of the present invention provides a power battery management system based on personalized configuration, which improves the existing power battery management system and adopts a personalized configuration architecture to match any personalized needs of users, thereby reducing the production and manufacturing costs of battery manufacturers, expanding the application scenario range of the battery management system, and improving the user experience.

In order to achieve the above-mentioned purpose, an embodiment of the present invention provides a power battery management system based on personalized configuration, the power battery management system including: a power battery configuration terminal, which is provided with multiple groups of power battery connection interfaces, each group of power battery connection interfaces is connected to a corresponding power battery unit; a power bus, the power battery unit is connected to the power bus through a corresponding group of power battery connection interfaces; a charging configuration terminal, which is provided with at least one group of charging connection interfaces, the charging devices are connected to the power bus through a corresponding group of charging connection interfaces; a power supply configuration terminal, which is provided with at least one group of power supply connection interfaces, the equipment input interfaces of the engineering equipment are connected to the power bus through a corresponding group of power supply connection interfaces, the engineering equipment includes at least one group of equipment input interfaces; a main control unit, which is communicatively connected to the power battery units and the charging devices respectively, and is used to control the on-off operation of the power battery connection interfaces, the charging connection interfaces, and the power supply connection interfaces according to the communication information; the first connection group number of the power battery connection interfaces, the second connection group number of the charging connection interfaces, and the third connection group number of the power supply connection interfaces are determined based on the personalized configuration parameters of the user.

Preferably, the number of the power battery units is determined based on the personalized configuration parameters, the connection mode between the power battery units is determined based on the first connection group number, and the connection mode between the power battery units and the power bus is determined based on the personalized configuration parameters.

Preferably, the power battery management system further includes a voltage adjustment circuit, the voltage adjustment circuit includes a first form circuit and a second form circuit, the first form circuit and the second form circuit have different input/output voltages, and the power bus is connected to the power battery unit through the voltage adjustment circuit; the main control unit is further used to: perform a circuit switching operation for the voltage adjustment circuit according to the present control state of the power battery unit.

Preferably, the first form circuit is a charging circuit, the second form circuit is a discharging circuit independent of the charging circuit, and the main control unit is used to: when the present control state is charging control, control the charging circuit to be in a conducting state; when the present control state is discharging control, control the discharging circuit to be in a conducting state; or the voltage adjustment circuit includes a plurality of first switch control devices configured in the current loop of the power battery unit, and the main control unit is used to: according to the present control state of the power battery units, control the first switch control device to perform a corresponding switch action, so as to switch the voltage adjustment circuit to a charging circuit or a discharging circuit corresponding to the present control state.

Preferably, the power bus is a strip bus, the strip bus includes power interfaces arranged sequentially on one side thereof and user interfaces arranged on the other side thereof; or the power bus is a plate bus, the plate bus includes power interfaces arranged sequentially around the plate bus, the user interfaces are arranged on one side of the plate bus where no power interface is arranged or on the center of the plate bus; or the power bus is a three-dimensional bus, the three-dimensional bus includes multiple faces, the power interfaces are arranged on at least one face, and the user interfaces are arranged on a face of the multiple faces where no power interface is arranged.

Preferably, the power battery unit is a plurality of power battery units with uniform electrical parameters; or the power battery unit includes at least one first power battery unit with a first electrical parameter and at least one second power battery unit with a second electrical parameter.

Preferably, the charging connection interfaces include a charging positive electrode interface, a positive electrode charging circuit, a charging negative electrode interface and a negative electrode charging circuit. The charging positive electrode interface is connected to the positive electrode output interface of the power bus through the positive electrode charging circuit, and the charging negative electrode interface is connected to the negative electrode output interface of the power bus through the negative electrode charging circuit. The positive electrode charging circuit is configured with a second switch control device, and the negative electrode charging circuit is configured with a third switch control device.

Preferably, when the second connection group number is greater than 1: the charging connection interfaces are respectively connected to multiple charging devices with the same charging parameters; or the charging connection interfaces are connected to at least one charging device with a first charging parameter and is connected to at least one charging device with a second charging parameter.

Preferably, the third connection group number is equal to the number of groups of the equipment input interfaces; or the third connection group number is greater than the number of groups of the equipment input interfaces.

Preferably, when the third connection group number is greater than 1, the power supply connection interface is a plurality of power supply connection interfaces with the same power supply parameters; or the power supply connection interface includes at least one first power supply connection interface with a first power supply parameter, and at least one second power supply connection interface with a second power supply parameter.

Preferably, the power battery management system further includes a battery self-starting circuit, which is connected to the power bus and is used to provide a voltage corresponding to the main control unit to start the main control unit.

Preferably, the battery self-starting circuit includes a first voltage conversion module and a self-starting trigger port, which is connected to the first voltage conversion module and the main control unit, and the first voltage conversion module is connected to the output interface of the power bus; or the battery self-starting circuit includes an external starting terminal and a self-starting trigger port, which is connected to the main control unit and the external starting terminal, and the external starting terminal provides a starting voltage corresponding to the main control unit.

Through the technical solution provided by the present invention, the present invention has at least the following technical effects:

By improving the existing power battery management system, adopting a configuration architecture based on the power bus, and configuring the corresponding power battery unit, charging device and power supply port according to the personalized needs of the customer, it is possible to realize a hardware framework to meet the various needs of various customers, and can adapt to application scenarios with different voltages and different powers, thereby reducing its research and development, production, and manufacturing costs, improving competitiveness, and meeting the personalized needs of customers and improving user experience.

Other features and advantages of the embodiments of the present invention will be described in detail in the subsequent specific implementation modes.

BRIEF DESCRIPTION OF THE DRAWINGS

The drawings are used to provide a further understanding of the embodiments of the present invention and constitute a part of the specification. Together with the following specific implementations, the drawings are used to explain the embodiments of the present invention, but do not constitute a limitation on the embodiments of the present invention. In the drawings.

DESCRIPTION OF REFERENCE NUMERALS

Figure 1:
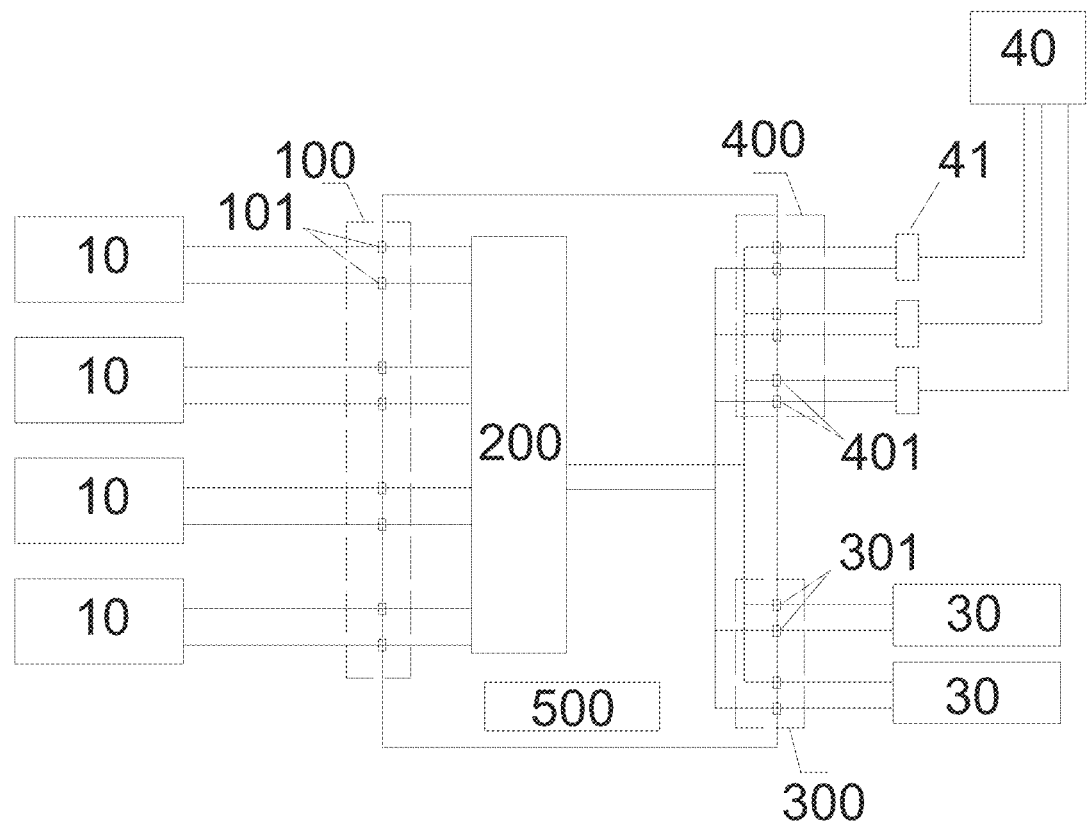
FIG. 1 is a schematic diagram showing the structure of a power battery management system based on personalized configuration provided by an embodiment of the present invention.

10 Power battery unit 11 First power battery unit
12 Second power battery unit 100 Power battery configuration terminal
101 Power battery connection interface 200 Power bus
201 Power interface 202 User interface
30 Charging device
300 Charging configuration terminal 301 Charging connection interface
3011 Charging positive electrode interface 3012 Charging negative electrode interface

- 3013 Positive electrode charging circuit 3014 Negative electrode charging circuit
- 40 Engineering equipment 41 Equipment input interface
- 400 Power supply configuration terminal 401 Power supply connection interface
- 4013 Positive electrode power supply circuit 4014 Negative electrode power supply circuit
- 411 First power supply connection interface 421 Second power supply connection interface
- 422 Second voltage conversion module 50 Second switch control device
- 500 Main control unit 60 Third switch control device
- 620 Self-starting trigger port 630 First voltage conversion module
- 640 External starting terminal
- 81 Sixth switch control device 82 Seventh switch control device
- 83 Interlock circuit 810 First form circuit
- 820 Second form circuit

DETAILED DESCRIPTION OF THE EMBODIMENTS

The specific implementation of the embodiment of the present invention is described in detail below in conjunction with the drawings. It should be understood that the specific implementation described here is only used to illustrate and explain the embodiment of the present invention and is not used to limit the embodiment of the present invention.

The terms "system" and "network" in the embodiment of the present invention can be used interchangeably. "Multiple/a plurality of" means two or more. In view of this, "multiple/a plurality of" can also be understood as "at least two" in the embodiment of the present invention. "And/or" describes the association relationship of the associated objects, indicating that there can be three relationships. For example, A and/or B can represent: A exists alone, A and B exist at the same time, and B exists alone. In addition, the character "/", unless otherwise specified, generally indicates that the previous and next associated objects are in an "or" relationship. In addition, it should be understood that in the description of the embodiment of the present invention, the words "first", "second" and the like are only used for the purpose of distinguishing the description and cannot be understood as indicating or implying relative importance, nor can they be understood as indicating or implying order.

The background technology of the present invention is first introduced below.

Due to the continuous development of new energy technology, on the basis of traditional battery applications, battery technology is applied to more and more technical fields, such as new energy vehicles. Since automobiles have the advantages of strong configuration consistency, strong input and output standardization, and strong charging norms, they are conducive to the standardization and large-scale application of power batteries. However, when applying power batteries to the field of industrial equipment, technicians found that there are at least the following technical problems:

On one hand, industrial equipment is applied to different industrial scenarios, and the power parameters required for different industrial scenarios are different, and the difference in power parameters in different industrial scenarios is relatively large, so the power battery system with the same configuration cannot be used to apply to different industrial scenarios; on the other hand, the number of industrial equipment used in each industrial scenario is much smaller than that in the field of new energy vehicles. Even in industrial scenarios with large enterprise scale, the number of industrial equipment used may be only dozens of units. Therefore, the existing power battery management system cannot be simply applied to all industrial scenarios, that is, battery companies cannot carry out large-scale production but need to customize corresponding power battery management systems for different industrial enterprises, which greatly increases the production and manufacturing costs of battery companies.

Please refer to FIG. 1. An embodiment of the present invention provides a power battery management system based on personalized configuration, and the power battery management system includes: the power battery configuration terminal 100, which is provided with multiple groups of power battery connection interfaces 101, and each group of power battery connection interfaces 101 is connected to the corresponding power battery unit 10; the power bus 200, and the power battery unit 10 is connected to the power bus 200 through the corresponding group of power battery connection interfaces 101; the charging configuration terminal 300, which is provided with at least one group of charging connection interfaces 301, and the charging devices 30 are connected to the power bus 200 through the corresponding group of charging connection interfaces 301; the power supply configuration terminal 400, which is provided with at least one group of power supply connection interfaces 401, the equipment input interfaces 41 of the engineering equipment 40 are connected to the power bus 200 through the corresponding group of power supply connection interfaces 401, and the engineering equipment 40 includes at least one group of equipment input interfaces 41; the main control unit 500 is communicatively connected to the power battery units 10 and the charging devices 30 respectively for controlling the on-off operation of the power battery connection interfaces 101, the charging connection interfaces 301, and the power supply connection interfaces 401 according to the communication information; the first connection group number of the power battery connection interfaces 101, the second connection group number of the charging connection interfaces 301, and the third connection group number of the power supply connection interfaces 401 are determined based on the user's personalized configuration parameters.

In a possible implementation, an industrial enterprise (i.e., a user) needs to configure a corresponding power battery management system for its engineering equipment 40, and first determines its personalized configuration parameters. The user's personalized configuration parameters include but are not limited to: required output voltage, required output current, required output power, configurable charging voltage, configurable charging current, configurable charging power, required number of power supply ports, required output power type, etc. For example, in this embodiment, the industrial enterprise needs to configure a power battery system with an output voltage of 160V and an output current of 600 A. According to the personalized configuration requirements, the number of the power battery units 10 required is first determined.

In the embodiment of the present invention, the number of the power battery units 10 is determined based on the personalized configuration parameters, the connection mode between the power battery units 10 is determined based on the first connection group number, and the connection mode between the power battery units 10 and the power bus 200 is determined based on the personalized configuration parameters.

In a possible implementation, the power battery unit 10 is a battery pack unit with a packaging structure, including but not limited to packaged cells, battery modules, battery packs, etc. Since the installation space of industrial equipment is very limited, the heat dissipation space of the power battery system is very small. In order to ensure its safety in use, preferably, the power battery unit 10 is composed of at least one low internal resistance cell, and the internal resistance of the low internal resistance cell is less than or equal to 0.5 mΩ, so as to adopt self-cooling as much as possible to reduce the investment cost of heat dissipation equipment. For example, in one embodiment, the power battery unit 10 is a packaged battery pack, each battery pack has a standard configuration of an output voltage of 80V and an output current of 200 A. Therefore, it can be determined that the industrial enterprise needs to configure six battery packs, where every two battery packs are connected in series to form a battery pack combination with an output voltage of 160V and an output current of 200 A, and then three of the battery pack combinations are connected in parallel to form a power battery pack combination with an output voltage of 160V and an output current of 600 A.

In the specific implementation process, in order to reduce the customization cost of battery manufacturers, battery manufacturers can determine a variety of different configuration methods according to actual needs. For example, in the first configuration method, the power battery management system includes the power battery configuration terminal 100 provided with three groups of power battery connection interfaces 101, and at least three groups of power battery units 10 are connected to the corresponding power battery connection interfaces 101 according to the user's personalized configuration needs; in the second configuration method, the power battery management system includes the power battery configuration terminal 100 provided with three groups of power battery connection interfaces 101, but the user only needs to use two groups of power battery connection interfaces 101. In the specific configuration process, the user can connect the two groups of power battery units 10 to the corresponding power battery connection interfaces 101, and the main control unit 500 performs corresponding control operations according to the connected power battery units 10.

In another possible implementation, in order to retain a certain amount of power reserve, the battery manufacturer connects three groups of power battery units 10 to the above three groups of power battery connection interfaces 101, but the main control unit 500 only controls the on-off operation of two groups of power battery connection interfaces 101, thereby realizing "soft control" of the first connection group number of the power battery connection interfaces 101 to meet the actual needs of customers.

Based on the same principle, the main control unit 500 can control the second connection group number of the charging connection interfaces 301 and the third connection group number of the power supply connection interfaces 401 according to the actual needs and the personalized configuration parameters of the user, that is, in the embodiment of the present invention, the first connection group number of the power battery connection interfaces 101, the second connection group number of the charging connection interfaces 301, and the third connection group number of the power supply connection interfaces 401 can be less than or equal to their actual setting number to meet the needs of personalized configuration, and at the same time, it is conducive to the standardized production of battery manufacturers, so that while meeting the different configuration requirements of different users and different application scenarios, it can maximize the standardized production of products, greatly reducing the product realization cost when meeting non-standard application scenarios, and improving the competitiveness of enterprises.

Figure 2:
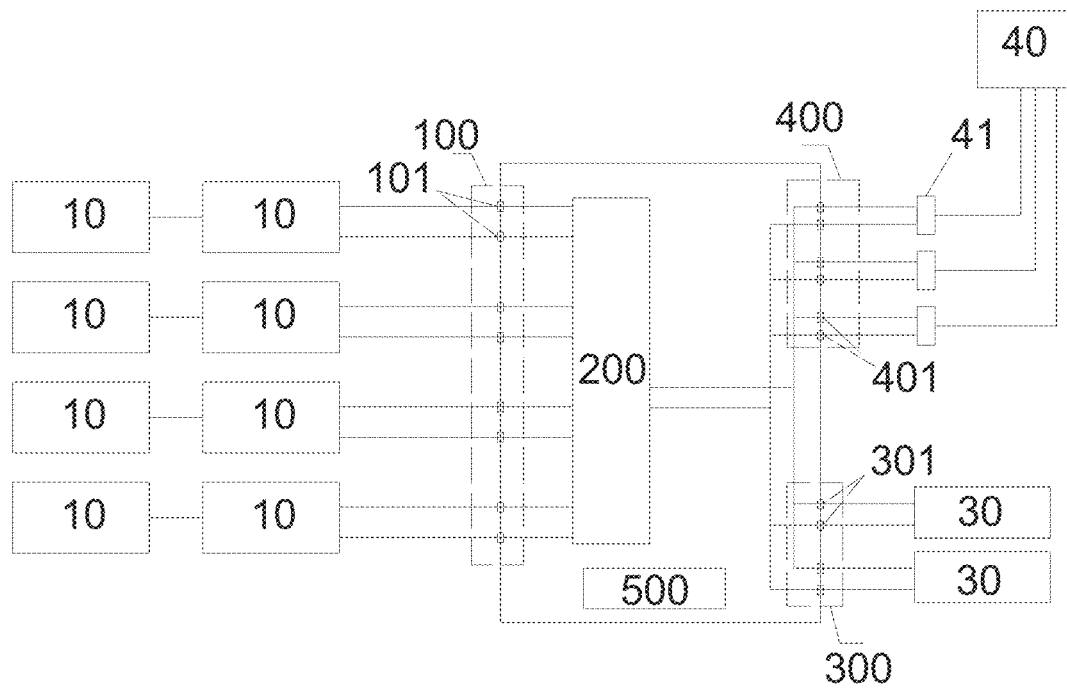
FIG. 2 is a schematic diagram showing the structure of a power battery management system based on personalized configuration provided by the second embodiment of the present invention.

The configuration of the power battery unit 10 is only a preferred embodiment. However, in actual application, due to the very limited space of the engineering equipment, there may be a problem that it is hard to configure the corresponding power battery connection interfaces 101 for each power battery unit 10 (for example, the remaining space on a certain power equipment can only configure four groups of power battery connection interfaces 10, but eight power battery units 10 are required to meet the actual power demand). Therefore, in order to solve the above technical problems, please refer to FIG. 2. In another embodiment, the user needs to configure a power battery system with a voltage of 320V and a current of 800 A. In order to reduce the space occupation, four groups of power battery connection interfaces 101 are set. First, the four groups of power battery units 10 are respectively connected to the corresponding power battery connection interfaces 101, and then a group of power battery units 10 are directly connected in series behind each group of power battery units 10 to form four groups of power battery packs with a voltage of 320V and a current of 200 A. Then, these four groups of power battery packs are connected in parallel to the power bus 200 to form a power battery system with a voltage of 320V and a current of 800 A, thereby meeting customer needs.

Certainly, technicians can configure the power battery units 10 with other electrical parameters according to actual needs or use other connection methods of the power battery units 10 to meet actual needs. For example, they can be connected partly in direct series or partly in parallel to achieve higher flexibility in capacity configuration, which will not be described in detail here.

That is, according to the personalized configuration parameters of the industrial enterprise, the number of the power battery units 10 to be configured and their connection methods are determined, and the connection methods include but are not limited to series connection, parallel connection, and series-parallel mixed connection. Each power battery unit 10 has a battery positive electrode and a battery negative electrode, which are connected to the corresponding power battery connection interfaces 101 of the power battery configuration terminal 100 through different power lines.

After determining the power battery unit 10 to be configured and its connection method, each power battery unit 10 is connected to the corresponding group (power battery positive electrode-power battery positive electrode connection interface, power battery negative electrode-power battery negative electrode connection interface) of power battery connection interfaces 101, and then the power battery connection interfaces 101 are connected to the power bus 200 according to the above connection method, thereby realizing the on-demand and personalized configuration of the power battery.

In the embodiment of the present invention, the personalized power battery configuration is determined according to the personalized needs of the user, and the corresponding installation operation is performed in a manner similar to building blocks, thereby meeting the personalized needs of the user. At the same time, the above method can greatly reduce the production and manufacturing costs of the battery manufacturer, thereby improving the competitiveness of the product and improving social benefits.

However, in the actual application process, simply connecting the power battery units 10 and the power bus 200 in series and parallel directly cannot meet a wider range of needs. For example, in one implementation scenario, the user expects to charge the battery system with high voltage (for example, 320V) to greatly improve the charging efficiency and reduce the charging time. When discharging, it is expected to output low voltage (for example, 80V) to meet the actual needs of the engineering equipment 40, while the existing power battery management system can only output fixed and identical input and output voltages, thereby failing to meet the actual needs of the user.

In order to solve the above technical problems, in an embodiment of the present invention, the power battery management system further includes a voltage adjustment circuit, the voltage adjustment circuit includes the first form circuit 810 and the second form circuit 820, the first form circuit 810 and the second form circuit 820 have different input/output voltages, the power bus 200 is connected to the power battery units 10 through the voltage adjustment circuit; the main control unit 500 is further used to: perform a circuit switching operation for the voltage adjustment circuit according to the present control state of the power battery units 10.

Figure 3:
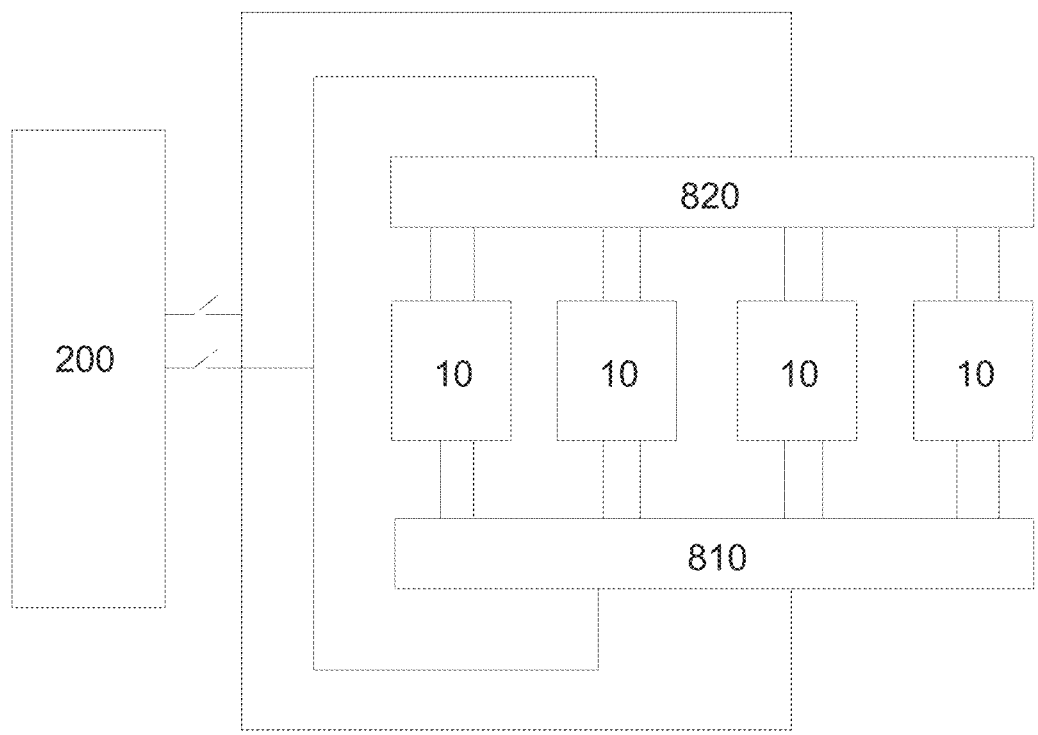
FIG. 3 is a schematic diagram of a voltage adjustment circuit provided by an embodiment of the present invention.

Please refer to FIG. 3. In the first embodiment, the first form circuit 810 is a charging circuit, and the second form circuit 820 is a discharging circuit. For example, the charging circuit is a series circuit. In this embodiment, the power battery system currently configured by the user is a system with an output voltage of 80V composed of four power battery units 10. When charging, the user expects to be able to charge with a high voltage of 320V to improve the charging efficiency. Therefore, the main control unit 500 controls the charging circuit to be turned on (the discharging circuit to be disconnected). Specifically, for example, switching devices (such as relays) are respectively configured on the charging circuit and the discharging circuit, and the corresponding relays are controlled to open or close when necessary to turn on or off the corresponding circuit. In combination with this embodiment, after the main control unit 500 controls the charging circuit to be turned on, the above-mentioned four power battery units 10 are connected in series. At this time, a charging gun with a charging voltage of 320V is inserted, and charging can be performed with high voltage and high power, thereby greatly improving the charging efficiency; when charging is completed, the main control unit 500 controls the charging circuit to be disconnected and the discharging circuit is turned on. For example, the discharging circuit is a parallel circuit. At this time, the four power battery units 10 are switched to be connected in parallel. When outputting voltage to the engineering equipment 40, low voltage and high current output can be performed, thereby meeting the user's personalized and dynamic configuration needs.

It should be noted that the drawings only show the electrical connection diagram of the power battery units 10, the voltage adjustment circuit, and the power bus 200, and cannot be regarded as a limitation of the physical connection relationship of the above components. The technician can select the appropriate physical connection method according to actual needs. For example, the technician can connect part of the power battery units 10 to the power bus 200 through the voltage adjustment circuit, and the rest of the power battery units 10 is directly connected to the power bus 200 to meet the greater configuration flexibility requirements, which will not be described in detail here.

However, the above implementation of the voltage adjustment circuit requires multiple circuit modes to be configured in the main control cabinet, resulting in a significant increase in the number of connections and plug-in interfaces, thereby increasing the risk of leakage accidents and causing certain pressure on the space occupied in the main control cabinet. Therefore, the present invention provides another implementation mode.

In the second embodiment, at least one first switch device (not shown) is configured on the current loop of each power battery unit 10. It should be noted that the switch device described in the embodiment of the present invention can be any one of power switch devices such as relays, gallium nitride power devices, or thyristors. By performing different switch control operations on the first switch device, the connection relationship of each power battery unit 10 is dynamically switched. When charging, the connection relationship is switched to a series charging circuit; when discharging, the connection relationship is switched to a parallel discharging circuit, thereby realizing dynamic management of the voltage adjustment circuit and meeting the personalized needs of users.

Certainly, the first switch device can also be controlled to switch the connection relationship to a parallel charging circuit during charging to achieve low-voltage charging; when discharging, the connection relationship is switched to a series discharging circuit to achieve high-voltage discharge, so as to meet the actual scene requirements of low charging and high discharge, effectively compatible with low-voltage charging guns, reduce the reconstruction of ground fixed facilities, and allow high-power high-voltage equipment to be charged and used normally, meeting the personalized needs of customers.

In the embodiment of the present invention, by setting a voltage adjustment circuit between the power bus 200 and the power battery units 10, the personalized needs of users can be further met, the compatibility and applicable scene range of the power battery management system are improved, and the production and manufacturing complexity of battery companies can be further reduced, the cost is reduced, and the competitiveness of companies is improved.

In the prior art, since the power lines of the power battery are often relatively thick and difficult to bend, the power bus 200 often adopts a strip bus. In the process of connecting the power battery units 10 to the power bus 200, the power lines of the power battery units 10 are generally directly connected to one side of the power bus 200, for example, connected to the power interfaces 201 arranged on one side of the power bus 200, and the other side serves as the output end of the power bus 200, specifically, it can be the user interface 202 arranged.

However, in actual application, due to the thickness of the power line and the spacing distance based on electrical safety considerations, the installation method of the above-mentioned strip bus takes up more space, and the space available for configuring the power battery system on the engineering equipment 40 is small, so the technicians proposed an improvement plan.

Figure 4:
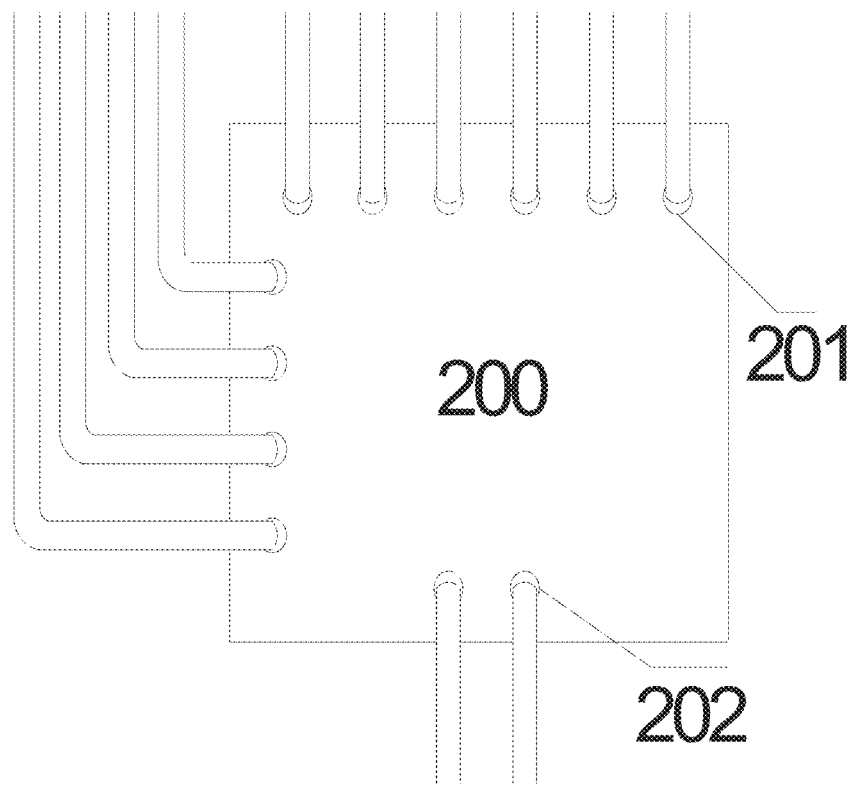
FIG. 4 is a schematic diagram of a plate bus provided by an embodiment of the present invention.

Please refer to FIG. 4. In a possible implementation, the power bus 200 is a plate bus, and the plate bus includes the power interfaces 201 arranged around the plate bus in sequence, and the user interfaces 202 are arranged on the side of the plate bus where the power interfaces 201 are not arranged or the center of the plate bus. During installation, the power line is connected to the power interfaces 201 arranged around the plate bus in sequence, and the user interfaces 202 are arranged on the side where the power interfaces 201 are not arranged or the center of the plate bus, so as to electrically avoid the power lines of the power battery units 10 and ensure its safety in use.

Figure 5:
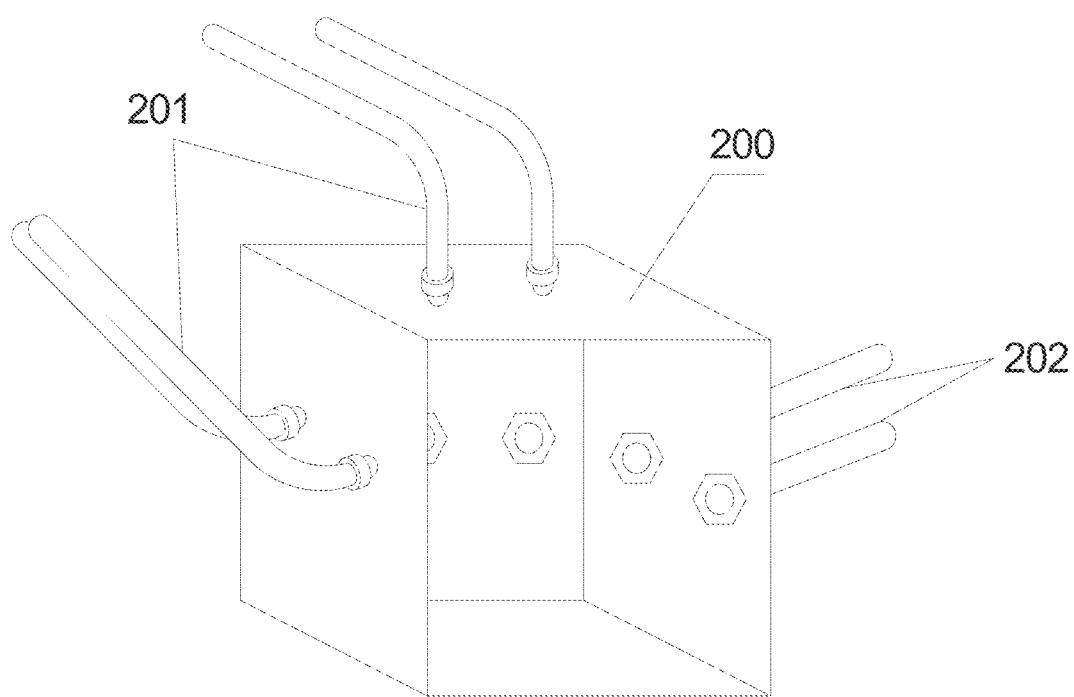
FIG. 5 is a schematic diagram of a three-dimensional bus provided by an embodiment of the present invention.

Further, referring to FIG. 5, in another possible implementation, the power bus 200 is a three-dimensional bus, the three-dimensional bus includes multiple faces, the power interfaces 201 are arranged on at least one face, and the user interfaces 202 are arranged on the face of the multiple faces where the power interfaces 201 are not arranged. During the installation process, the technician connects the power line to the power interfaces 201 arranged on different faces in turn, and the user interfaces 202 are arranged on the face where the power interfaces 201 are not arranged. Preferably, the face where the user interfaces 202 are arranged faces the equipment input interfaces of the engineering equipment 40.

In the embodiment of the present invention, by improving the shape structure of the power bus 200, the space occupied by the power bus 200 in the main control cabinet is greatly reduced, the space utilization rate is improved, and the technical effect of configuring a power battery system with a larger output power in a smaller space is achieved, which meets the needs of users and improves the user experience.

In the prior art, the power battery units 10 configured in the power battery management system are often a plurality of standard battery pack units with the same electrical parameters, such as a standard battery pack. However, in actual use, in order to meet the more personalized needs of customers and the actual production and operation needs of battery companies, the power battery units 10 are also configured to include at least one first power battery unit 11 having first electrical parameters and at least one second power battery unit 12 having second electrical parameters.

Figure 6:
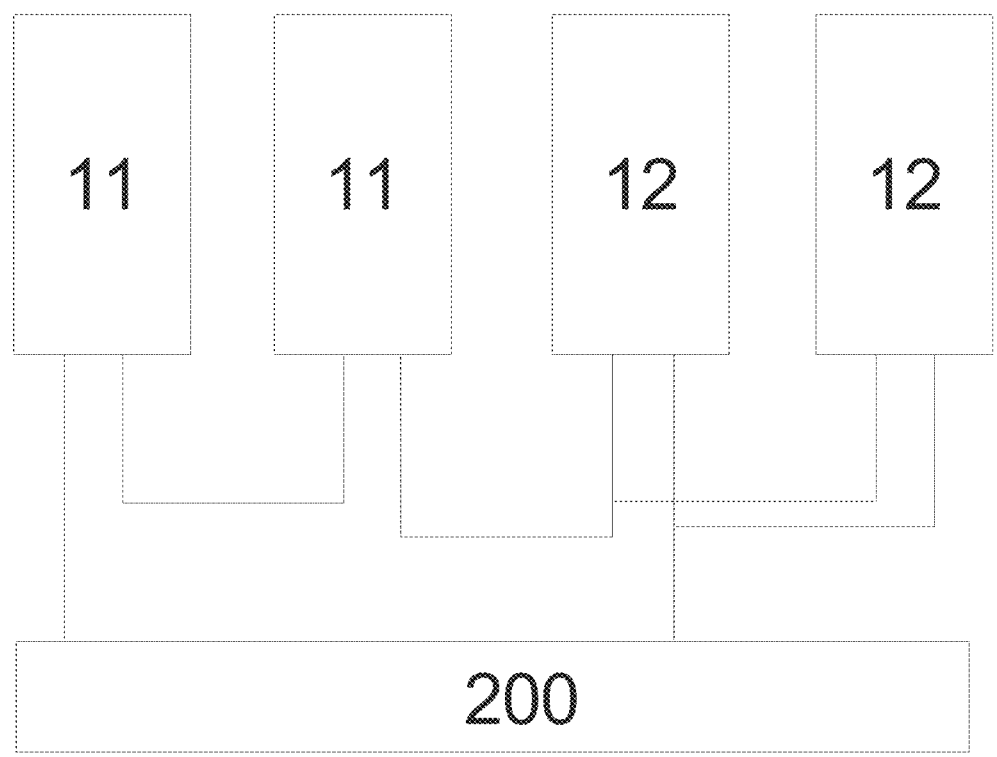
FIG. 6 is a schematic diagram of configuring different power battery units provided by an embodiment of the present invention.

For example, please refer to FIG. 6. In a possible implementation, according to the personalized needs of the user, in order to adapt to the limited battery space of the user's vehicle, or the special voltage requirements, when it is hard to use all power battery units with single electrical parameters to meet the user's requirements (for example, in the application scenario where the output requirement is 200A, 200V), two first power battery units 11 with an output voltage of 80V and an output current of 200 A are configured for customer, which are connected in series; at the same time, two second power battery units 12 with an output voltage of 40V and an output current of 100 A are configured for user, which are connected in parallel, and then the first power battery units 11 connected in series and the second power battery units 12 connected in parallel are connected in series to form a power battery combination with an output voltage of 200V and an output current of 200 A, which is then connected to the power bus 200 for power output.

It should be noted that the above electrical parameters include but are not limited to output voltage, output current, operating temperature, operating humidity, operating pressure, battery curve, and other electrical parameters. In order to meet the different needs of users or battery companies, the power battery units 10 that meet the above electrical parameters can be used according to actual conditions, and no further details are given here.

In the embodiment of the present invention, by performing personalized and non-standard configuration on the power battery units constituting the power battery management system, combined with the power battery management architecture provided by the embodiment of the present invention, it is possible to further meet the personalized needs of users, meet the actual production and operation needs of enterprises, increase the scope of applicable scenarios of the product, and improve user experience. At the same time, power battery units with different parameters have different volume shapes, which are convenient for technicians to arrange more flexibly and achieve better space utilization.

Figure 7A:
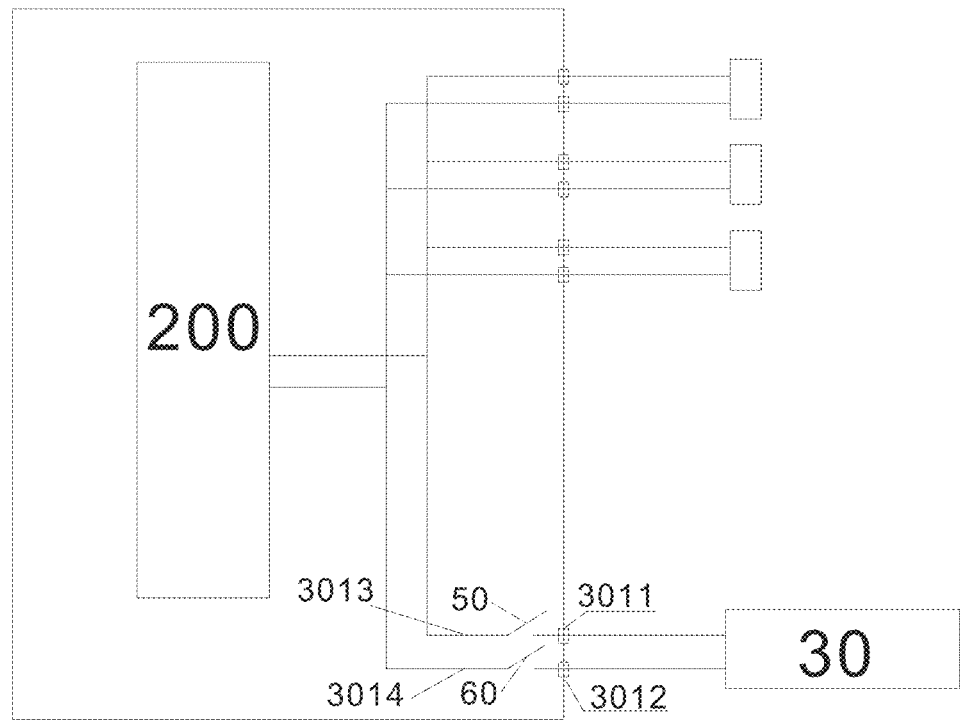
FIG. 7A is a schematic diagram of configuring a switch control device at a charging connection interface provided by an embodiment of the present invention.

After determining the configuration requirements of the power battery units 10, the charging configuration is further determined according to the personalized configuration parameters, see FIG. 7A. In the embodiment of the present invention, the charging connection interfaces 301 include the charging positive electrode interface 3011, the positive electrode charging circuit 3013, the charging negative electrode interface 3012, and a negative electrode charging circuit 3014. The charging positive electrode interface 3011 is connected to the positive electrode output interface of the power bus 200 through the positive electrode charging circuit 3013, and the charging negative electrode interface 3012 is connected to the negative electrode output interface of the power bus 200 through the negative electrode charging circuit. The positive electrode charging circuit 3013 is configured with the second switch control device 50, and the negative electrode charging circuit 3014 is configured with the third switch control device 60.

In a possible implementation, the charging devices 30 with an output voltage of 160V are configured in the application scenario of an industrial enterprise. The charging devices 30 include but are not limited to a charging pile, a dedicated charging socket, a charging station, etc. For example, in this embodiment, the charging device 30 is a charging gun. The rated charging requirements of the above-mentioned power battery pack combination can be met by the charging gun, so the requirements can be met by configuring a charging gun for the power battery pack combination.

In actual application, when the charging gun is inserted into the charging connection interfaces, the main control unit 500 obtains the charging request through communication with the charging gun. For example, the charging connection interfaces also include a charging communication interface, and the main control unit 500 communicates with the charging gun through the charging communication interface. At this time, the main control unit 500 first determines whether the preset charging conditions are currently met. The preset charging conditions include but are not limited to that each power battery unit 10 (corresponding relay) is in the on state, each group of power supply connection interfaces is in the off state, and the charging protocol is determined. After determining that the preset charging conditions are currently met, the second switch control device 50 configured in the positive electrode charging circuit and the third switch control device 60 configured in the negative electrode charging circuit are controlled to be turned on, thereby turning on the charging circuit for charging operation.

Since the input or output current in the field of power battery system is very huge, after the relay is used for a long time, it may become sticky or faulty due to aging, which will lead to direct connection between the charging end and the power supply end, causing great safety hazards. Therefore, in the embodiment of the present invention, by configuring switch devices in both the positive electrode charging circuit 3013 and the negative electrode charging circuit 3014, the sticking or faulty of the switch device of any charging circuit will not affect the disconnection control of the entire charging circuit, thereby effectively solving the safety hazards caused by this. At the same time, the main control unit 500 can timely detect the faulty switch device and perform alarm processing, thereby ensuring the safety of the entire power battery management system.

Figure 7B:
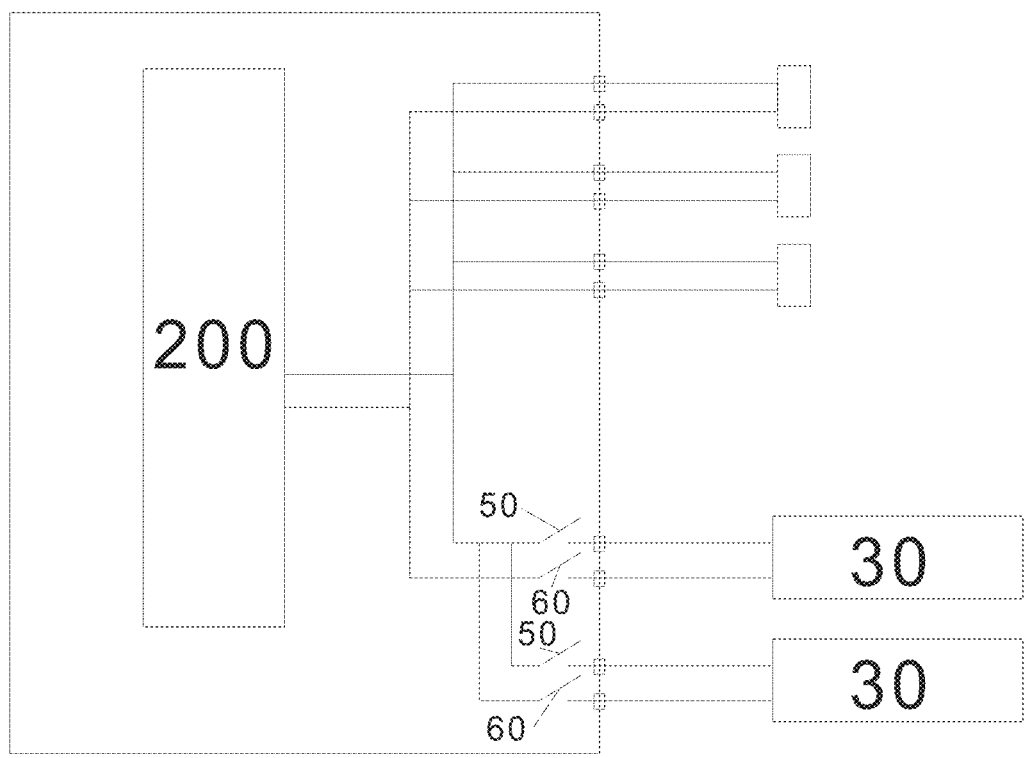
FIG. 7B is a schematic diagram of connecting multiple configured charging connection interfaces in parallel provided by an embodiment of the present invention.

Please refer to FIG. 7B. In the second embodiment, according to the personalized configuration parameters of a second industrial enterprise, the rated charging parameters of the power battery pack combination are determined to be the voltage of 160V and the current of 400 A. Although the application scenario of the second industrial enterprise is configured with the charging devices 30 with an output voltage of 160V, the charging current of the charging devices 30 is only 200A, so the charging efficiency is low; therefore, according to the personalized configuration parameters, it is determined that one or two charging devices 30 need to be configured. When two charging devices are configured, the maximum charging efficiency can be achieved by inserting two charging devices 30 at the same time and performing parallel connection on the charging connection interfaces 301 that are connected to the two charging devices 30.

In the embodiment of the present invention, by providing the corresponding charging interface configuration according to the personalized configuration requirements of the user and the charging parameters that can be provided, it can meet the customer's arbitrary charging configuration requirements, greatly improve the compatibility range of the power battery management system, reduce the production and manufacturing complexity of the enterprise, and reduce costs.

In actual application, industrial enterprises may configure multiple charging devices 30 in application scenarios based on actual needs (for example, based on safety considerations, cost considerations, etc.), such as configuring at least one fast charging gun and at least one slow charging gun, or configuring two groups of fast charging interfaces to improve charging efficiency. When charging, a fast-charging gun and a slow charging gun can be inserted at the same time. When the battery power is low, both charging guns perform charging operations. When the battery power reaches a certain value (for example, 80%), the main control unit 500 controls the fast-charging gun to stop charging and controls the slow charging gun to continue charging until the battery power is full, so as to achieve battery balance and optimization.

In another possible implementation, in order to meet the uniform requirements of charging voltage and improve the comprehensive charging efficiency of the charging devices 30, the charging connection interfaces 301 can be connected to a charging device with a first charging voltage and a first charging current, and to a charging device with a first charging voltage and a second charging current, respectively, to meet the above requirements and achieve better and personalized requirements.

In the embodiment of the present invention, by adopting the charging devices 30 of various specifications, the personalized charging needs of users can be met, the user experience is improved, the configuration cost of the user is reduced, and the damage to the battery during the charging process is reduced, thereby increasing the battery lifespan.

At this time, the number of the power supply connection interfaces 401 to be configured is further determined according to the personalized configuration parameters of the industrial enterprise. Based on the same principle, in an embodiment of the present invention, the power supply connection interfaces 401 may also include a corresponding power supply positive electrode interface (not shown), the positive electrode power supply circuit 4013, a power supply negative electrode interface (not shown) and the negative electrode power supply circuit 4014, and a fourth switch control device (not shown) may be configured in the positive electrode power supply circuit, and a fifth switch control device (not shown) may be configured in the negative electrode power supply circuit.

In a possible implementation, the user's engineering equipment 40 is equipped with the equipment input interfaces 41, that is, a power input is required, so a group of power supply connection interfaces 401 is configured at the power supply configuration terminal 400. After the user inserts the equipment input interfaces 41 of the engineering equipment 40 into the power supply connection interfaces 401, the main control unit 500 may first determine whether the preset power supply conditions are met at present, and the preset power supply conditions include but are not limited to each power battery unit 10 (corresponding relay) being in the on state, each group of charging connection interfaces being in the off state, and determining the power supply communication protocol. After determining that the preset power supply conditions are currently met, the main control unit 500 controls the fourth switch control device configured in the positive electrode power supply circuit and the fifth switch control device configured in the negative electrode power supply circuit to close, so as to output power to the engineering equipment 40.

In the embodiment of the present invention, by configuring switch devices at both the positive electrode and negative electrode of the power supply circuit, effective protection of the engineering equipment 40 is achieved, which can effectively avoid safety accidents caused by sticking or faulty of any switch device in the power supply circuit, thereby improving the safety of the power battery management system.

However, in the process of actual application, the user's engineering equipment 40 often requires more than one equipment input interface 41. For example, in one embodiment, the engineering equipment 40 to be applied includes two equipment input interfaces, one equipment input interface 41 is an input interface for driving a motor, and the other equipment input interface 41 is an input interface for driving other power components (such as a hydraulic mechanical arm). Therefore, two groups of power supply connection interfaces 401 are configured, and each group of power supply connection interfaces 401 is respectively connected to the corresponding equipment input interface 41 to perform power supply operation.

In the second embodiment, the engineering equipment 40 includes three equipment input interfaces 41, two of which are power input interfaces, which are respectively used to drive different power components, and the third equipment input interface 41 is a low-voltage input interface, which is used to provide power for low-voltage components (such as display screens, etc.). Therefore, three groups of power supply connection interfaces 401 are configured, and the third power supply connection interface 401 is connected to the voltage conversion module configured on the engineering equipment 40 to provide a low-voltage power supply for the engineering equipment 40.

In the embodiment of the present invention, according to the personalized needs of the user, the personalized number of power supply interfaces is provided to the user, and the user is no longer required to configure multiple power battery systems or multiple energy supply systems for the engineering equipment 40, thereby greatly reducing the user's capital expenditure, reducing the space occupation of the engineering equipment 40, meeting the personalized needs of the user, and improving the user experience.

In the application process, it is easy for those skilled in the art to know that since engineering equipment is often a large current device, the switch device used therein, particularly a relay with higher safety, is often more expensive. Therefore, if a relay is configured in each power supply or charging circuit, the user's cost will increase.

Figure 8:
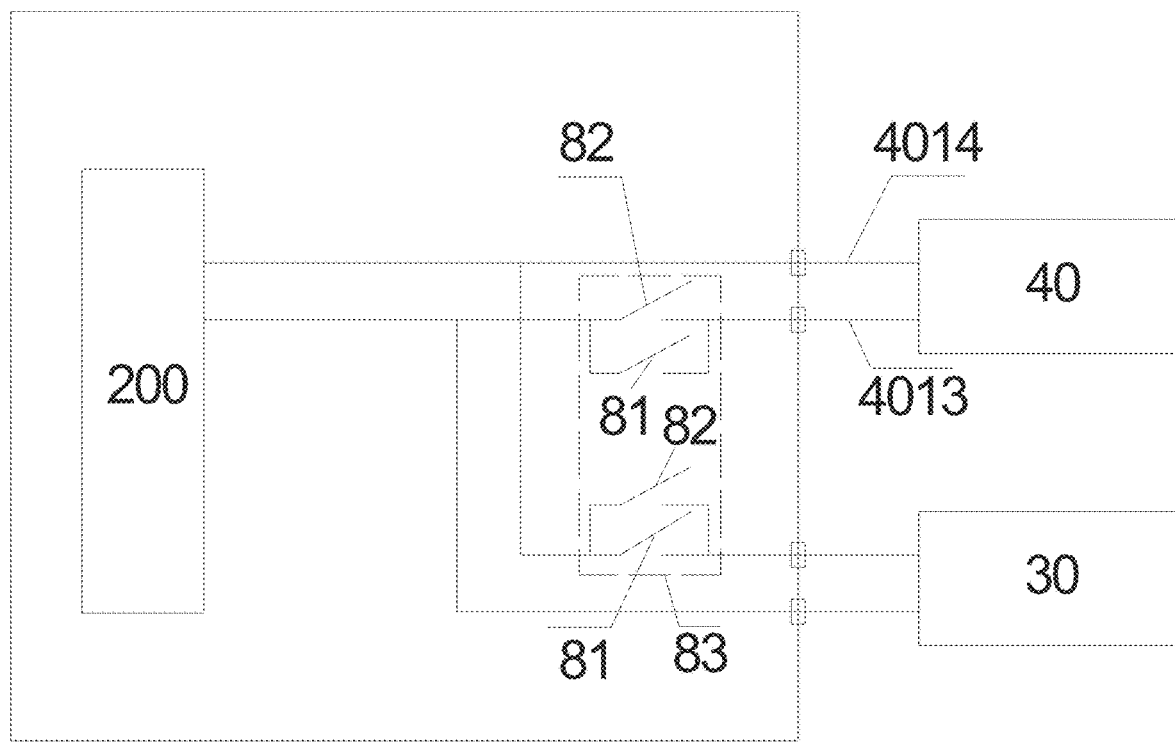
FIG. 8 is a schematic diagram of configuring an interlock circuit for a charging circuit and a power supply circuit provided by an embodiment of the present invention.

In order to solve the above technical problems, please refer to FIG. 8. In the embodiment of the present invention, the charging connection interfaces 301 include the positive electrode charging circuit 3013 and the negative electrode charging circuit 3014, and the power supply connection interfaces 401 include the positive electrode power supply circuit 4013 and the negative electrode power supply circuit 4014. The sixth switch control device 81 is configured on the positive electrode charging circuit 3013 or the negative electrode charging circuit 3014, and the seventh switch control device 82 is configured on the positive electrode power supply circuit 4013 or the negative electrode power supply circuit 4014. The interlock circuit 83 is set between the sixth switch control device 81 and the seventh switch control device 82.

In a possible implementation, the main control unit 500 obtains a power supply request sent from the engineering equipment 40 at a certain moment, so the sixth switch control device 81 is disconnected and the seventh switch control device 82 is closed to perform the power supply operation. After the power supply is completed, the main control unit 500 controls the seventh switch control device 82 to disconnect. However, at this time, the seventh switch control device 82 is sticking and not effectively disconnected. In the process of the main control unit 500 controlling the sixth switch control device 81 to close according to the charging request, the interlock circuit 83 is triggered because the seventh switch control device 82 cannot be disconnected, resulting in the sixth switch control device 81 cannot be closed, so that the power battery units 10 cannot be charged, thereby avoiding the electric energy input by the charging devices 30 from being directly output to the engineering equipment 40, thereby effectively protecting the safety of the engineering equipment 40.

Furthermore, in order to ensure the safety of the use of the power battery system, a master switch control device can be set between the charging devices 30 and the charging connection interfaces 301, and a master switch device can be set between the engineering equipment 40 and the power supply connection interfaces 401. When the main control unit 500 detects that there may be a situation where the relay is sticking, it can control the corresponding master switch device to disconnect, so as to ensure that all interfaces can be effectively disconnected and improve the safety of use.

In the embodiment of the present invention, by adopting a relay combined with an interlock circuit, a technical solution is implemented to achieve the best safety control effect with the minimum control cost, effectively protecting the user's safety of use and ensuring the power supply safety of the engineering equipment 40.

In the implementation process, the engineering equipment 40 generally includes a power drive component and a low-voltage drive component. The power drive device is driven by the power electrical energy output by the power battery management system. In the prior art, low-voltage drive components, such as display screens, alarms, sensors, and other components, are often powered by additional low-voltage batteries configured on the engineering equipment 40. On the other hand, With the increasing functionality and popularity of electronic components, the existing engineering equipment 40 may face the need for functional expansion, such as the need to configure an additional surveillance camera on the engineering equipment 40, which requires additional low-voltage power supply, causing certain troubles to users.

In order to solve the above technical problems, the third connection group number of the power supply connection interfaces 401 configured on the power supply configuration terminal 400 is greater than the number of groups of the equipment input interfaces. For example, in a possible implementation, three groups of power supply connection interfaces 401 are set on the power supply configuration terminal 400, of which one group of power supply connection interfaces 401 is used to drive the engineering equipment 40, the second group of power supply connection interfaces 401 is used to drive the lifting device, and the third group of power supply connection interfaces 401 is vacant to meet the additional power supply needs of the engineering equipment 40. In this embodiment, the above three power supply connection interfaces 401 are power supply connection interfaces with the same power supply parameters (including but not limited to power supply voltage, power supply current, power supply power, and other parameters).

In actual application, since the additional power supply requirements on the engineering equipment 40 may be different from the power supply voltage and other parameters of the power supply requirements, the multiple power supply connection interfaces 401 provided with the same power supply parameters cannot meet the user's needs. The user needs to configure an additional voltage conversion module to meet the actual needs, which causes additional expenses for the user and reduces the user experience.

Figure 9:
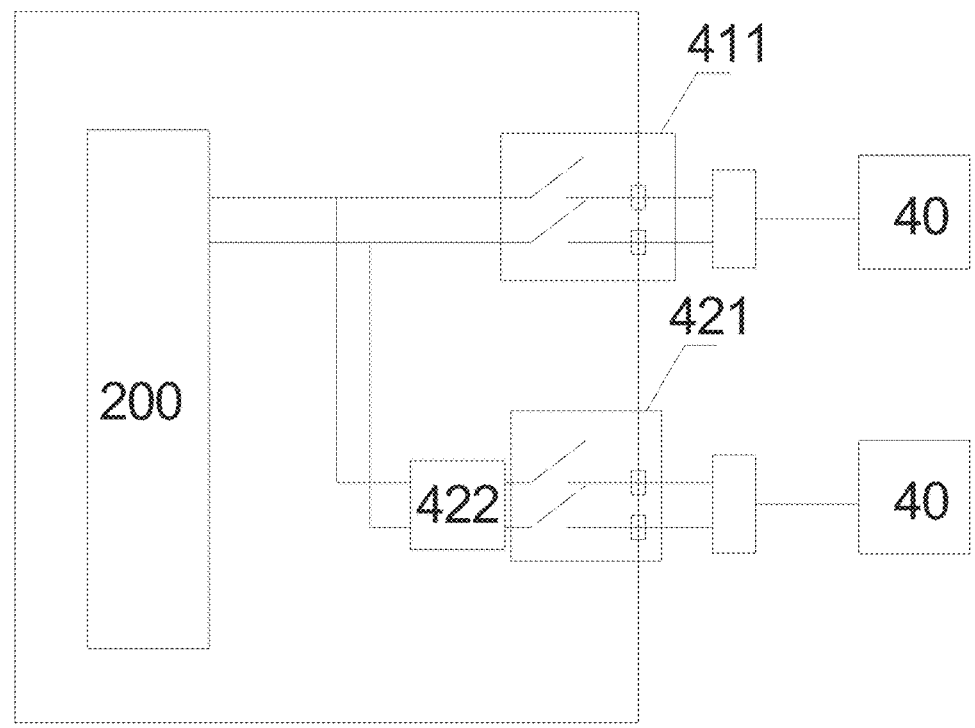
FIG. 9 is a schematic diagram of configuring a power supply connection interface with different parameters provided by an embodiment of the present invention.

Please refer to FIG. 9. In the second embodiment, the power supply connection interfaces 401 include at least one first power supply connection interface 411 with a first power supply parameter, and at least one second power supply connection interface 421 with a second power supply parameter. In the specific implementation process, for example, the first power supply connection interface 411 is directly connected to the output end of the power bus 200, and the additional second voltage conversion module 422 is configured between the power bus 200 and the second power supply connection interface 421. Through the second voltage conversion module 422, the output voltage of the power bus 200 can be converted into a low voltage that can be used by the user to meet the actual use of the user. In order to ensure the reliability of power output, the above-mentioned vacant third group of power supply connection interfaces 401 can be used only to output low voltage to meet the power supply requirements of low voltage and low current.

Each power battery unit 10 also includes a first communication line, each charging device 30 also includes a second communication line, and each equipment input interface 41 may also include a third communication line. The main control unit 500 is connected to each power battery unit 10 through the first communication line to control the power battery units 10 to perform corresponding power charging and discharging operations. Specifically, a power battery communication interface is provided at a position adjacent to the power battery connection interface 101 on the battery box, and the main control unit 500 is connected to the first communication line through the power battery communication interface. The input/output end of each power battery unit 10 also includes a switch device, for example, the switch device is a relay. The main control unit 500 controls the opening and closing of each relay to control the corresponding power battery unit 10 to disconnect or connect, so as to control it to perform corresponding power charging and discharging operations.

The main control unit 500 is connected to the charging devices 30 through the second communication line to control the charging devices 30 to perform the corresponding charging operation. For example, in one embodiment, a charging communication interface is set at a position adjacent to the charging connection interface 301 on the battery box, and the main control unit 500 is connected to the second communication line through the charging communication interface. The technician inserts the charging devices 30 into the corresponding charging connection interface 301 at a certain moment. At this time, the main control unit 500 obtains the charging request. If the main control unit 500 determines that the present power battery management system meets the charging conditions, the charging devices 30 are controlled to perform the corresponding charging operation.

Based on the same principle, the main control unit 500 can also be connected to the equipment input interfaces 41 through the third communication line to control the power supply operation for the engineering equipment 40. Certainly, it should be noted that the communication between the main control unit 500 and the equipment input interfaces 41 is not necessary. When the power equipment is connected to the power supply connection interfaces 401 through the equipment input interfaces 41, the main control unit 500 can directly control the power output to it without the need of communication or judgment.

In the existing power battery management system, since the voltage and current output by the power battery are relatively large compared to the main control unit 500, the startup or driving of the main control unit 500 often relies on an external power supply (such as an external low-voltage battery). For example, in the power battery management system of a new energy vehicle, the main control unit needs to be powered by an external battery to start, and then the output of the power battery is controlled by the started main control unit. However, in the field of engineering equipment, due to the limitation of installation space, and the simplified design based on cost limitation or engineering equipment itself, the above method has caused some trouble to users.

In an embodiment of the present invention, the power battery management system further includes a battery self-starting circuit, which is connected to the power bus 200 and is used to provide a voltage corresponding to the main control unit to start the main control unit 500.

Figure 10A:
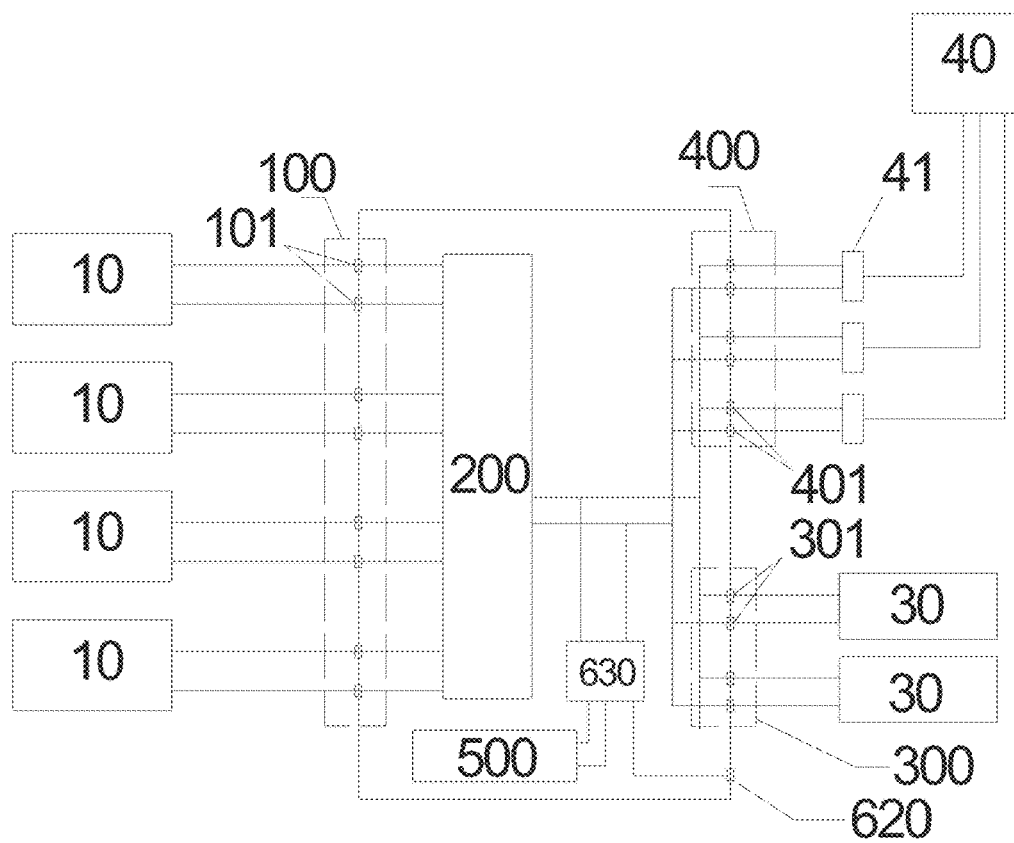
FIG. 10A is a schematic diagram of a battery self-starting circuit provided by the first embodiment of the present invention.

Please refer to FIG. 10A. In the first embodiment, the battery self-starting circuit includes the first voltage conversion module 630 and the self-starting trigger port 620. The self-starting trigger port 620 is connected to the first voltage conversion module 630 and the main control unit 500, and the first voltage conversion module 630 is connected to the output interface of the power bus 200. Specifically, the first voltage conversion module 630 is connected to the power bus 200 and performs low-voltage conversion on the voltage output by the power bus 200 to output a low voltage for driving the main control unit 500. In this embodiment, the self-starting trigger port 620 is connected to the starting button of the cab configured in the engineering equipment 40. When the user needs to start the engineering equipment 40, by pressing the starting button of the cab to connect the first voltage conversion module 630 with the main control unit 500 through the self-starting trigger port 620. At this time, the main control unit 500 starts and starts the entire power supply system.

In the embodiment of the present invention, by configuring a battery self-starting circuit for the power battery management system, it can be self-started without relying on an external low-voltage battery, which greatly improves the control convenience and user experience.

In the actual use process, the technicians also found that in some application scenarios of engineering equipment, the engineering equipment 40 is strictly restricted to use, for example, it can only be used by technicians who are allowed or authorized, and the existing startup method cannot limit or identify the users of the engineering equipment 40.

Figure 10B:
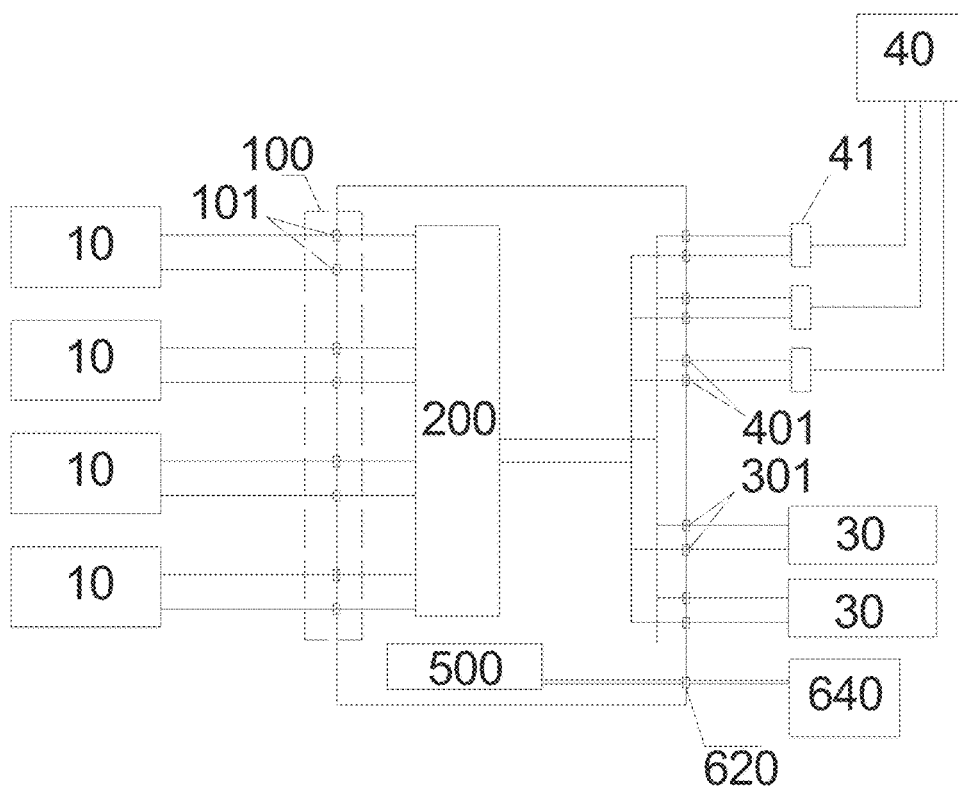
FIG. 10B is a schematic diagram of a battery self-starting circuit provided by the second embodiment of the present invention.

Please refer to FIG. 10B. In the second embodiment, the battery self-starting circuit includes an external starting terminal 640 and a self-starting trigger port 620. The self-starting trigger port 620 is connected to the main control unit 500 and the external starting terminal 640. The external starting terminal 640 provides a start voltage corresponding to the main control unit 500. Specifically, the external starting terminal 640 is a terminal device with an instruction sending function, such as but not limited to a personal computer, a host computer, a tablet computer, a laptop computer, a dedicated handheld device, etc. The external starting terminal 640 can provide a corresponding start voltage to the main control unit 500.

During use, the technician needs to start the present engineering equipment 40, so first log in to the above-mentioned external starting terminal 640, for example, by entering an authorized account and password or key to log in to the terminal, and then click the starting button in the operation interface of the external starting terminal 640 to send a startup instruction to the self-starting trigger port 620. The self-starting trigger port 620 connects communicatively the main control unit 500 and the external starting terminal 640 according to the startup instruction. At this time, the main control unit 500 starts according to the startup voltage provided by the external starting terminal 640 and performs system initialization operations.

In the embodiment of the present invention, by adopting a communication control and drive method based on an external terminal, the self-start of the main control unit 500 can be achieved without the need of configuring an additional low-voltage battery or a first voltage conversion module 630, and the security verification of the person starting the engineering equipment 40 can be effectively performed, thereby improving the safety of the use of the engineering equipment 40.

The optional implementation modes of the embodiments of the present invention are described in detail above in conjunction with the drawings, but the embodiments of the present invention are not limited to the specific details of the above implementation modes. Within the technical idea scope of the embodiments of the present invention, the technical solutions of the embodiments of the present invention can be subjected to a variety of simple modifications, and these simple modifications all belong to the protection scope of the embodiments of the present invention.

It should also be noted that the various specific technical features described in the above specific implementations can be combined in any suitable manner, including physical segmentation and separation, if there is no contradiction. In order to avoid unnecessary repetition, the embodiments of the present invention will not further describe various possible combinations.

In addition, the various different implementations of the embodiments of the present invention can also be combined arbitrarily, as long as they do not violate the ideas of the embodiments of the present invention, they should also be regarded as the contents disclosed by the embodiments of the present invention.

The invention claimed is:

1. A power battery management system based on personalized configuration, applied to engineering equipment in industrial scenarios, wherein the power battery management system comprises:
   a power battery configuration terminal, provided with a plurality of groups of power battery connection interfaces, wherein each of the plurality of groups of power battery connection interfaces is connected to a corresponding power battery unit;
   a power bus, connected to the power battery unit through a corresponding group of power battery connection interfaces;
   a charging configuration terminal, provided with at least one group of charging connection interfaces, wherein a charging device is connected to the power bus through a corresponding group of charging connection interfaces of the at least one group of charging connection interfaces;
   a power supply configuration terminal, provided with at least one group of power supply connection interfaces, wherein an equipment input interface of the engineering equipment is connected to the power bus through the corresponding group of power supply connection interfaces, and the engineering equipment comprises at least one group of equipment input interfaces; and
   a main control unit, communicatively connected to the power battery unit and the charging device respectively, and configured to control an on-off operation of the power battery connection interfaces, the charging connection interfaces, and the power supply connection interfaces according to communication information;
   wherein a first connection group number of the power battery connection interfaces, a second connection group number of the charging connection interfaces, and a third connection group number of the power supply connection interfaces are determined based on user's personalized configuration parameters;
   wherein the power battery management system further comprises a battery self-starting circuit, wherein the battery self-starting circuit is connected to the power bus and is configured to provide a voltage corresponding to the main control unit to start the main control unit;
   wherein the battery self-starting circuit comprises an external starting terminal and a self-starting trigger port, wherein the self-starting trigger port is connected to the main control unit and the external starting terminal, and the external starting terminal is configured to:
   acquire authorization information;
   perform a terminal login operation based on the authorization information; and
   generate a start instruction in response to a start operation, and send the start instruction to the self-starting trigger port;
   wherein the self-starting trigger port is configured to:
   connect the main control unit and the external starting terminal based on the start instruction; and
   wherein the external starting terminal is further configured to: provide a start voltage corresponding to the main control unit.

2. The power battery management system according to claim 1, wherein a number of the power battery unit is determined based on the user's personalized configuration parameters, a connection mode between the power battery units is determined based on the first connection group number, and a connection mode between the power battery units and the power bus is determined based on the user's personalized configuration parameters.

3. The power battery management system according to claim 2, wherein the power battery management system further comprises a voltage adjustment circuit, the voltage adjustment circuit comprises a first form circuit and a second form circuit, the first form circuit and the second form circuit have different input/output voltages, and the power bus is connected to the power battery unit through the voltage adjustment circuit; and the main control unit is further configured to:
   according to a present control state of the power battery unit, perform a circuit switching operation for the voltage adjustment circuit.

4. The power battery management system according to claim 3, wherein the first form circuit is a charging circuit, the second form circuit is a discharging circuit independent of the charging circuit, and the main control unit is configured to: when the present control state is charging control, control the charging circuit to be in a conducting state; and when the present control state is discharging control, control the discharging circuit to be in the conducting state; or
   the voltage adjustment circuit comprises a plurality of first switch control devices configured in a current loop of the power battery unit, and the main control unit is configured to: according to the present control state of the power battery unit, control the plurality of first switch control device to perform a corresponding switch action to switch the voltage adjustment circuit to the charging circuit or the discharging circuit corresponding to the present control state.

5. The power battery management system according to claim 2, wherein the power bus is a strip bus, wherein the strip bus comprises a power interface arranged in sequence on one side thereof and a user interface arranged on another side thereof, or
   the power bus is a plate bus, wherein the plate bus comprises the power interface arranged in sequence around the plate bus, the user interface is arranged on a side of the plate bus where the power interface is not arranged or is arranged at a center of the plate bus; or
   the power bus is a three-dimensional bus, wherein the three-dimensional bus comprises a plurality of faces, the power interface is arranged on at least one face, and the user interface is arranged on a face of the plurality of faces where the power interface is not arranged.

6. The power battery management system according to claim 2, wherein the power battery unit is a plurality of power battery units with uniform electrical parameters; or
   the power battery unit comprises at least one first power battery unit with a first electrical parameter and at least one second power battery unit with a second electrical parameter.

7. The power battery management system according to claim 1, wherein the at least one group of charging connection interfaces comprise a charging positive electrode interface, a positive electrode charging circuit, a charging negative electrode interface, and a negative electrode charging circuit, wherein the charging positive electrode interface is connected to a positive electrode output interface of the power bus through the positive electrode charging circuit, the charging negative electrode interface is connected to a negative electrode output interface of the power bus through the negative electrode charging circuit, the positive electrode charging circuit is configured with a second switch control device, and the negative electrode charging circuit is configured with a third switch control device.

8. The power battery management system according to claim 1, wherein when the second connection group number is greater than 1:
- the at least one group of charging connection interfaces are respectively connected to a plurality of charging devices with identical charging parameters; or
- the at least one group of charging connection interfaces are connected to at least one charging device with a first charging parameter, and is connected to at least one charging device with a second charging parameter.

9. The power battery management system according to claim 1, wherein when the third connection group number is greater than 1, the at least one group of power supply connection interfaces are a plurality of power supply connection interfaces with identical power supply parameters; or
- the at least one group of power supply connection interfaces comprise at least one first power supply connection interface with a first power supply parameter, and at least one second power supply connection interface with a second power supply parameter.

* * * * *